(12) United States Patent  
Sankaran et al.

(10) Patent No.: US 8,638,833 B1
(45) Date of Patent: Jan. 28, 2014

(54) METHOD AND APPARATUS FOR PHYSICAL LAYER CONTROL COMMUNICATIONS IN A WIRELESS COMMUNICATIONS PROTOCOL

(75) Inventors: Sundar G. Sankaran, Campbell, CA (US); Tevlik Yucek, Sunnyvale, CA (US); Paul Petrus, San Jose, CA (US); Matthew Smith, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 12/512,896

(22) Filed: Jul. 30, 2009

(51) Int. Cl.
*H04B 1/00* (2006.01)
(52) U.S. Cl.
USPC .......................................... 375/141; 370/328
(58) Field of Classification Search
None
See application file for complete search history.

(56) References Cited

U.S. PATENT DOCUMENTS

| | | | |
|---|---|---|---|
| 2007/0070939 A1* | 3/2007 | Hottinen | 370/328 |
| 2010/0265990 A1* | 10/2010 | Birru | 375/130 |
| 2011/0176527 A1* | 7/2011 | Efland et al. | 370/338 |

* cited by examiner

Primary Examiner — Leon-Viet Nguyen
(74) Attorney, Agent, or Firm — Bever, Hoffman & Harms, LLP

(57) ABSTRACT

A system is disclosed with a first transceiver configured to communicate with a second transceiver. The first transceiver includes a message encoded by a spreading code and a transmitter configured to use beam forming to send the message as a beamformed transmit message to the second transceiver in one of multiple regions repeatedly targeted by the beam forming. The transceivers include a receiver configured to operating without beam forming in receiving to decode the message using the spreading code with a spreading length to compensate for the lack of beam forming. Other embodiments may include an integrated circuit with a processor operating a transmitter and a receiver of the first or the second transceiver. The integrated circuit may act as a central point, a base station and/or an access point communicating with a client, or operate the transceiver as the client, a station or as a cellular phone.

27 Claims, 3 Drawing Sheets

METHOD AND APPARATUS FOR PHYSICAL LAYER CONTROL COMMUNICATIONS IN A WIRELESS COMMUNICATIONS PROTOCOL

TECHNICAL FIELD

This invention relates to apparatus and methods for operating the apparatus implementing control communications in a wireless communications protocol at the PHYsical (PHY) layer of the protocol.

BACKGROUND OF THE INVENTION

Beam forming is often used to extend the range of wireless communication links by focusing radio frequency (RF) energy along a chosen "direction" instead of in "all" directions creating a link budget gain and an increase in range. With respect to an RF transmitter, beam forming may be accomplished through the use of a plurality of antennas transmitting two or more RF signals. The antennas allow the transmitted RF energy to be steered or "beam formed". Similarly, an RF receiver may use a plurality of antennas to selectively receive RF energy. Thus, beam forming requires that the transmitter and the receiver know the relative positions of each other to correctly direct the RF energy. The beam forming at the transmitter and the receiver provide a signal processing gain compared to omnio-directional transmission and reception which in turn may increase the signal-to-noise ratio within a communication system.

There are many well-known methods to determine relative positions of transmitters and receivers, such as those set forth in the IEEE 802.11n specification. Beam forming works well when the transmitter knows the "direction" of the receiver. However, there are scenarios where information, such as control information, needs to be exchanged between transmitter and receiver before the transmitter knows the direction of the receiver (and thus before beam forming may be reliability employed). Also, sometimes certain information needs to be broadcast to all the receivers in the vicinity, so that transmitting the signal along just one direction may be insufficient since the receivers may be distributed in many directions. Many communication protocols have surmounted this challenge by defining an alternate signaling technique, usually referred to as Control PHY signaling. While the normal data exchange is done with beam forming using the "normal" PHY, the control information exchange, which typically does not make use of beam forming, is done using Control PHY signaling.

One problem with this approach is more noticeable when a Physical transport operates at a relatively high frequency, for example around 60 GHz. At these frequencies, there is relatively high propagation loss and, even with beam forming, a range of only ten meters may be achieved. Without beam forming, the range may drop to much less than ten meters. Methods and apparatus are needed that can be used for control information exchange where the range is not substantially diminished when traditional beam forming techniques may not be available.

SUMMARY OF THE INVENTION

Embodiments may include a system and/or a method operating a first transceiver configured to communicate a message to a second transceiver. The first transceiver includes a transmitter with the message encoded by a spreading code and configured to operate the transmitter using beam forming to send the message as a beam formed transmit message to the second transceiver in one of multiple regions repeatedly targeted by the beam forming. The first and second transceivers each include a receiver configured to operate without beam forming to receive and decode the message using the spreading code with a spreading length to compensate for the lack of beam forming. The spreading length may provide some number of decibels above the noise floor of a communications network. These operations may be performed during a control PHYsical (PHY) messaging step in a wireless communications protocol.

Other embodiments may include an integrated circuit with a processor operating the transmitter and the receiver of the second transceiver. The processor may operate the transmitter with a beam formed to cover a region of at least one client transceiver. There may be multiple regions covering more than one of the client transceivers. The beam forming operation may be repeated and may persist in covering a region for at least long enough to send at least one PHY communication message as the beamformed transmit message. Operating the transmitter may implement a time division multiplexed beam forming scheme and may further implement superframes arranged in a more or less uniform radially symmetric pattern, possibly with multiple superframes.

The integrated circuit may perform the role of a central point and/or a base station and/or an access point communicating with multiple clients in a wireless network. The transceiver may be operated as a client in such a wireless network. The client may serve as a station in some wireless communications protocols or as a cellular phone in a cellular network.

DETAILED DESCRIPTION

Embodiments in this specification describe apparatus and methods for implementing a control communications exchange in a wireless communications system. Embodiments may include a system with a first transceiver configured to communicate a message to a second transceiver. The first transceiver includes a transmitter with the message encoded by a spreading code and configured to operate the transmitter using beam forming to send the message as a beamformed transmit message to the second transceiver. The second transceiver includes a receiver configured to operate without beam forming in receiving the beamformed transmit message to decode the message using the spreading code with a spreading length to compensate for the lack of beam forming. Other embodiments may include an integrated circuit with a processor operating the transmitter of the first transceiver and/or operating the receiver of the second transceiver.

Figure 1:
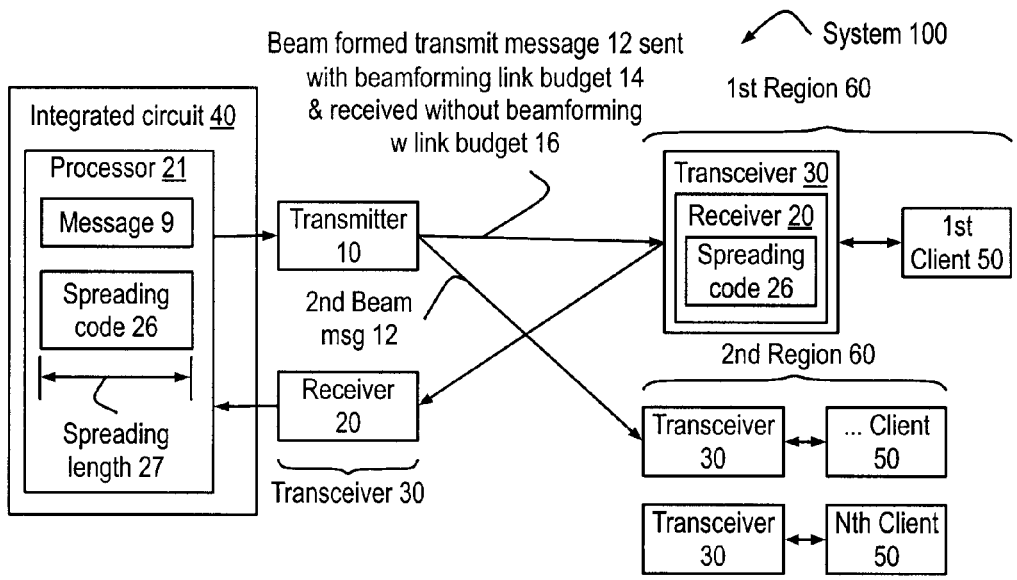
FIG. 1 shows a simplified communications diagram showing a system with the first transceiver on the left using its transmitter with beam forming to send a message encoded by a spreading code to send a beam formed transmit message to the second transceiver whose receiver lacks beam forming and uses the spreading length of the spreading code to compensate for the lack of beam forming to decode the message.

Referring to the drawings more particularly by reference numbers, FIG. 1 shows a simplified communications diagram of a system 100 with a first transceiver 30 on the left using its transmitter 10 with beam forming to send a message 9 encoded by a spreading code 26 as a beamformed transmit message 12 to the second transceiver 30 on the right whose receiver 20 lacks beam forming and uses the spreading length 27 of the spreading code 26 to compensate for the lack of beam forming to decode the message 9.

An integrated circuit 40 may include a processor 21 operating the transmitter 10 of the first transceiver 30 on the left forming a beam to cover a region 60 of at least one client transceiver 30. There may be a plurality of regions 60 that cover more than one of the client transceivers 30. These regions may be serviced by the first transceiver 30 with each repetition of the formed beam of the transmitter 10 persisting at least long enough to send at least one message 12 in a control PHY communication. The processor may operate the transmitter 10 and/or receiver 20 with the spreading code 26. The spreading code length 27 may be long enough to compensate for a decrease in the link budget 16 caused a lack of beam forming at the receiver 20 (compared to the link budget with beam forming 14 at the transmitter 10).

The transmitter 10 may transmit a plurality of beam formed PHY communication messages 12. Each beam formed PHY communication message 12 may be sent (steered) to different regions 60. This spreading code 26 may enable the transceiver 30 to more effectively process the beam formed transmit message 12 upon reception.

By way of example, and not limitation, consider a wireless communication system operating within a 60 GHz band. Since propagation losses are relatively high in that band, both transmitter and receiver will typically employ beam forming techniques to obtain a relative increase in the signal-to-noise (SNR) ratio (with respect to non-beamformed transmissions). Since a PHY communication message 12 cannot apply beam forming techniques to both the transmitter and the receiver, the method described above may be applied. The message 9 may be encoded with spreading code 26 such as a Golay code sequence with spreading length 27 of 64 that may allow operation some number of decibels above the noise floor of the communications network. Other embodiments may use different spreading codes of different lengths which may increase a signal processing gain and may also increase design complexity. Note that the link budget to a third transceiver by a second beam formed transmit message 12 may differ from the first of such messages to the second transceiver.

Figure 2:
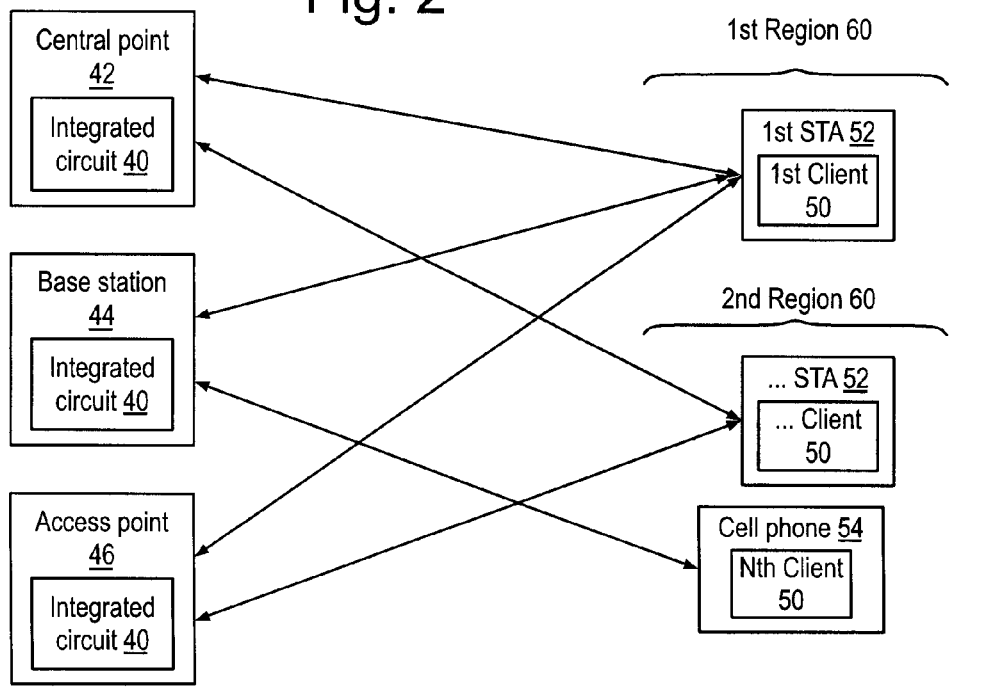
FIG. 2 shows examples of embodiments of the system of FIG. 1 with the integrated circuits performing the role of a central point, a base station and/or an access point communicating with multiple clients possibly supporting stations in a wireless network and/or cellular phones in a cellular network.

FIG. 2 shows examples of embodiments of the integrated circuits 40 performing the role of a central point 42 that may implement a base station 44 and/or an access point 46 communicating with one or more clients 50 in a wireless network. As used herein, the client may act like a station 52 in a wireless network and/or a cellular phone 54 in a cellular network.

Figure 3:
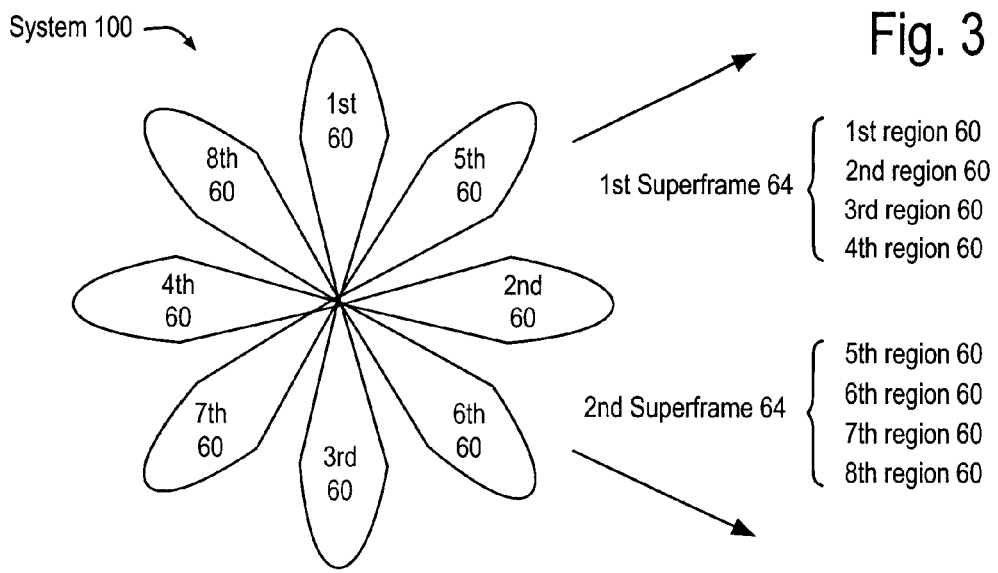
FIG. 3 shows an example of some refinements of the regions based upon a stylized portrayal of the main lobe of a beam formed pattern.

FIG. 3 shows an example of some refinements of the regions 60 based upon a stylized portrayal of the main lobe of a beam formed pattern. In many applications, the main lobes of neighboring regions may overlap. This example shows eight regions that may be further organized into one, or in this case two, superframes used to organize PHY communication messages 12. In certain embodiments, the regions 60 may each be given a time slot in which the transmitter 10 directs the beam to the region.

The integrated circuits 40 may or may not include the transmitter 10 and/or the receiver 20. FIG. 1 showed the integrated circuit not including the transmitter and receiver.

Figure 4:
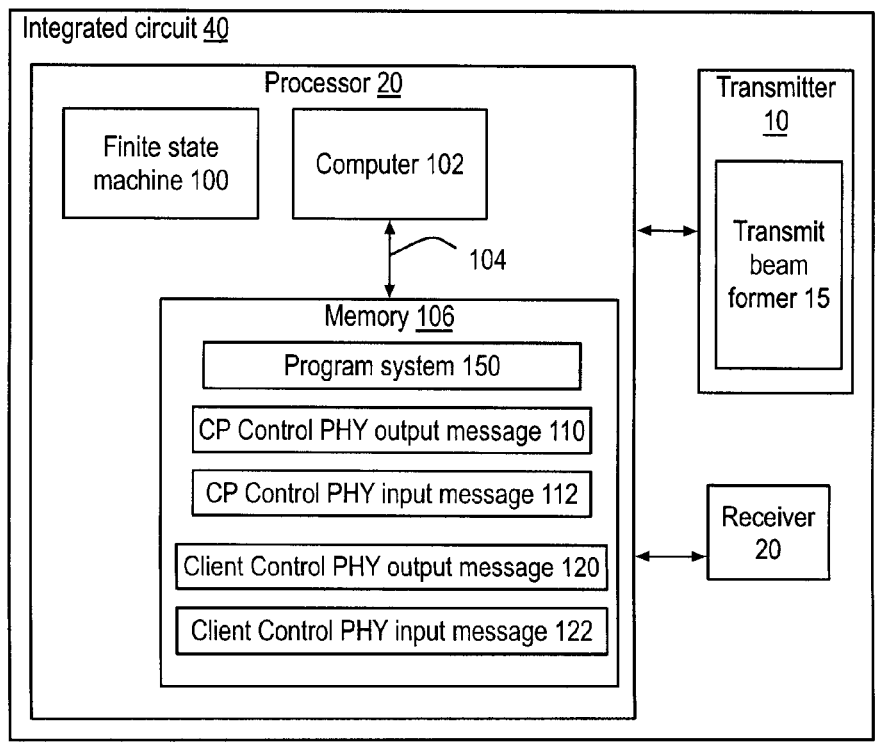
FIG. 4 shows the integrated circuit of FIG. 1 including the transmitter and the receiver with the processor including at least one instance of a finite state machine and/or a computer instructed by a program system residing in a computer readable memory.

FIG. 4 shows the integrated circuit 40 including the transmitter 10 and the receiver 20. The processor 21 may further include at least one instance of a finite state machine 100 and/or at least one instance of a computer 102 accessibly coupled 104 with a computer readable memory 106 that may contain a program system 150 to implement the methods described in this specification, possibly to create any combination of the following: a Central Point (CP) Control PHY output message 110, a CP Control PHY input message 112, a Client Control PHY output message 120 and/or a Client Control PHY input message 22. In certain embodiments, the central point 42 may act as an access point 44 in a wireless network and/or as a base station 46 in a cellular network. The transmitter 10 may include a transmit beam former 15 that may include an analog and/or a digital beam former. The receiver may include a demodulator 24 using the spreading code 26 to create a demodulated PHY message 28.

As used herein, any computer may include at least one data processor and at least one instruction processor instructed by a program system, where each of the data processors is instructed by at least one of the instruction processors. A finite state machine receives at least one input, maintains and updates at least one state and generates at least one output based upon the value of at least one of the inputs and/or the value of at least one of the states.

Some of the following figures show flowcharts of at least one embodiment of the methods for sending and receiving PHY communication messages 12, which may include arrows signifying a flow of control, and sometimes data, supporting various implementations. These flowcharts may include a program operation, or program thread, executing upon the computer 102 or states of a finite state machine 100. Each of these program steps may at least partly support the operation to be performed. Other circuitry such as radio components, specialized encoders and/or decoders, modulators, demodulators, memory management and so on may also be involved in performing the operation. The operation of starting a flowchart refers to entering a subroutine or a macro-instruction sequence in the computer or of a possibly initial state or condition of the finite state machine. The operation of termination in a flowchart refers to completion of those operations, which may result in a subroutine return in the computer or possibly return the finite state machine to a previous condition or state. The operation of terminating a flowchart is denoted by a rounded box with the word "Exit" in it.

Figure 5:
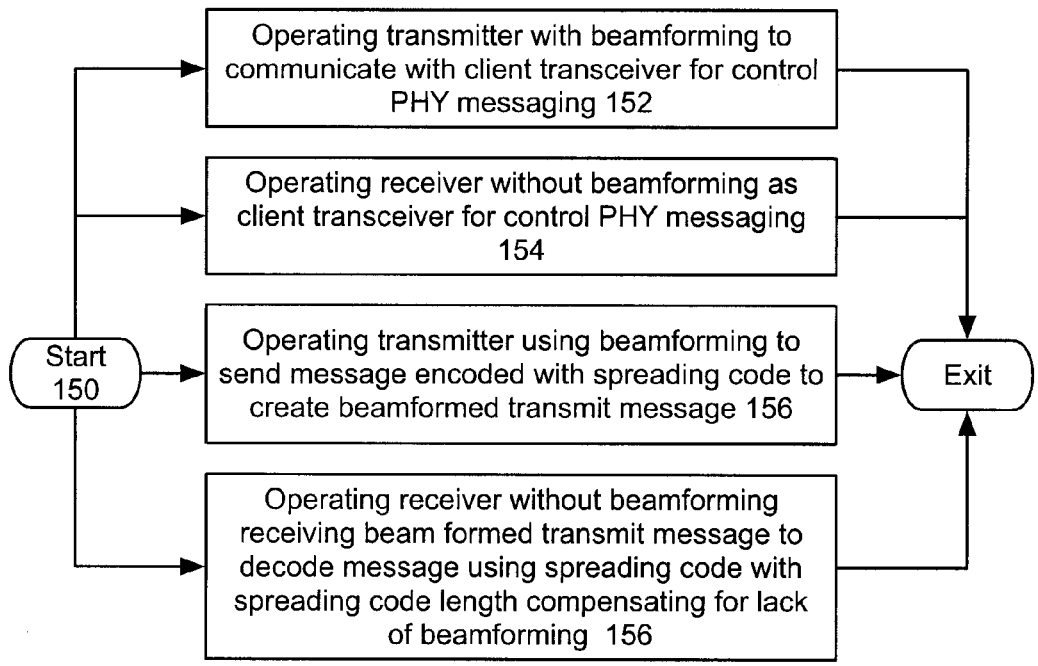
FIGS. 5 and 6 show flowcharts of some details of the program system shown in FIG. 4.

FIG. 5 shows a flowchart of some details of the program system 150 of FIG. 4 including at least one of the following: Program step 152 supports operating the transmitter 10 with beam forming to communicate with a client transceiver for PHY communications messaging. Program step 154 supports operating the receiver without beam forming as the transceiver 30 of a client 50 for control PHY messaging. Program step 156 supports operating the transmitter 10 with beam forming to send a message encoded with a spreading code to create the beam formed transmit message 12.

The program system 150 of FIG. 4 may further include program step 158 that supports operating the receiver 20 without beam forming to receive and decode the message 9 using the spreading code 26 with its spreading length 27 to compensate for the lack of beam forming at the receiver 20.

The program step 158 may further support operating the receiver 20 without beam forming in receiving the beam-formed transmit message 12 to decode the message 9 using the spreading code 26 with its spreading length 27 to compensate for the lack of beam forming at the receiver 20.

Figure 6:
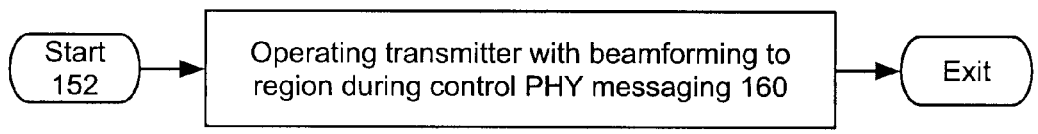

FIG. 6 shows a flowchart of some details of the program step 152 operating the transmitter including program step 160 supports operating the transmitter 10 with beam forming to a region 60 during the control PHY messaging 12.

The preceding embodiments provide examples of the invention, and are not meant to constrain the scope of the following claims.

What is claimed is:

1. A system, comprising:
a first device including a first transceiver adapted to wirelessly communicate with a second device including a second transceiver,
said first transceiver including a transmitter and a message encoded by a spreading code and adapted to operate said transmitter using beam forming to send said message as a beam formed transmit message to said second transceiver in one of multiple regions repeatedly targeted by said beam forming, wherein said first transceiver is further adapted to wirelessly communicate said message to said second transceiver during control PHYsical (PHY) messaging, and
both said first transceiver and said second transceiver each including a receiver adapted to operate with a lack of said beam forming to decode said message from the other transceiver using said spreading code with a spreading length to compensate for said lack of said beam forming.

2. The system of claim 1,
wherein said first device is included in at least one member of a group consisting of a central point, a base station, and an access point, and
wherein said second device is included in at least one member of another group consisting of a client communicating with said central point, a station in a wireless network communicating with said access point, and a cellular phone communicating in a cellular network with said base station.

3. An integrated circuit, comprising:
a processor adapted to operate with a transmitter and a receiver,
said processor adapted to operate said transmitter with beam forming to send a wireless message to a remote receiver, the wireless message encoded by a spreading code to create a first beam formed transmit message, and
said processor adapted to operate said receiver with a lack of said beam forming to receive and to decode a second beam formed transmit message from a remote transmitter using said spreading code with a spreading length to compensate for said lack of said beam forming,
wherein said processor is further adapted to operate said receiver with said lack of said beam forming to receive a wireless control PHYsical (PHY) message from said remote transmitter that is sending the second beam formed transmit message.

4. The integrated circuit of claim 3, wherein said processor is further adapted to operate said transmitter and said receiver as a client transceiver.

5. The integrated circuit of claim 3, wherein said integrated circuit acts as at least one member of a group consisting of a central point, an access point and a base station.

6. The integrated circuit of claim 3, wherein said integrated circuit acts as at least one member of a group consisting of a station and a cellular phone.

7. The integrated circuit of claim 3, wherein said processor includes at least one instance of at least one member of a group consisting of a finite state machine and a computer accessibly coupled to a computer readable memory including a program system of at least one program step instructing said computer.

8. The integrated circuit of claim 7, wherein said at least one program step includes:
operating said transmitter and said receiver to communicate with a client transceiver for control PHY messaging;
operating said transmitter and said receiver to communicate as said client transceiver for said control PHY messaging; and
operating said transmitter to send said wireless message based upon said spreading code and using said beam forming to create said first beam formed transmit message; and
wherein said program system further comprises another program step of:
operating said receiver based upon said spreading code to compensate for said lack of said beam forming in receiving said second beam formed transmit message.

9. The integrated circuit of claim 8, wherein said program step of operating said transmitter and said receiver to communicate with said client transceiver for said control PHY messaging, further comprises another program step of:
operating said transmitter with said beam forming to one region during said control PHY messaging.

10. The integrated circuit of claim 8, wherein said program step of operating said transmitter and said receiver to communicate as said client transceiver for said control PHY messaging, further comprises another program step of:
operating said receiver during said control PHY messaging based upon said spreading code to compensate for said lack of said beam forming in receiving said second beam formed transmit message.

11. A method, comprising:
a processor operating a transceiver to process a message, said message being a control PHYsical (PHY) message;
said processor operating a transmitter with beam forming to send said message encoded with a spreading code to create a first wireless beam formed transmit message, said first wireless beam formed transmit message to be sent to a remote receiver; and
said processor operating a receiver with a lack of said beam forming to receive a second wireless beam formed transmit message from a remote transmitter and to decode said second wireless beam formed transmit message using said spreading code with a spreading length to compensate for said lack of said beam forming in said receiver.

12. The method of claim 11,
wherein said operating said receiver with said lack of said beam forming further comprises operating said receiver to decode said control PHY message.

13. The method of claim 11, wherein said operating said transmitter with said beam forming further comprises operating said transmitter with said beam forming to a region to communicate with at least one client in said region.

14. The method of claim 11, further comprising at least one of:
said processor operating as a central point to at least one client;

said processor operating as an access point to said at least one client;

said processor operating as a base station to said at least one client;

said processor operating as said at least one client as a station in a wireless network; and said processor operating as said at least one client as a cellular phone in a cellular network.

15. A first transceiver of a first wireless device comprising:
a transmitter; and
a receiver,
wherein the transmitter is adapted to send a message encoded by a spreading code to a second transceiver of a second wireless device using beam forming during control PHYsical (PHY) messaging, the spreading code having a spreading length that compensates for a lack of the beam forming of the second transceiver.

16. The first transceiver of claim 15, wherein the first transceiver is included in at least one member of a group consisting of: a central point, a base station, and an access point, and wherein the second transceiver is included in at least one member of another group consisting of a client communicating with the central point, a station in a wireless network communicating with the access point, and a cellular phone communicating in a cellular network with the base station.

17. An integrated circuit comprising:
a processor adapted to operate with a transmitter and a receiver,
wherein the processor is further adapted to operate the transmitter with beam forming to send a first wireless message encoded by a spreading code to a remote receiver,
wherein the processor is further adapted to operate the receiver without the beam forming to receive and decode a second wireless message from a remote transmitter using the spreading code, and
wherein the processor is further adapted to operate the receiver to receive a control PHYsical (PHY) message from the second wireless message.

18. The integrated circuit of claim 17, wherein the processor is further adapted to operate the transmitter and the receiver as a client transceiver.

19. The integrated circuit of claim 17, wherein the integrated circuit acts as at least one member of a group consisting of a central point, an access point, and a base station.

20. The integrated circuit of claim 17, wherein the integrated circuit acts as at least one member of a group consisting of a station and a cellular phone.

21. The integrated circuit of claim 17, wherein the processor includes at least one instance of at least one member of a group consisting of a finite state machine and a computer accessibly coupled to a computer readable memory including a program system of at least one program step instructing the computer.

22. The integrated circuit of claim 21, wherein the at least one program step includes:
operating the transmitter with the beam forming to one region during control PHY messaging.

23. The integrated circuit of claim 21, wherein the at least one program step includes:
operating the receiver during control PHY messaging based upon the spreading code to compensate for no beam forming to receive the second wireless message.

24. A method of operating at least one transceiver to process a message, the method comprising:
operating a transmitter with beam forming to send a first wireless message encoded with a spreading code to a remote receiver, the first wireless message being a control PHYsical (PHY) message; and
operating a receiver without beam forming to receive and decode a second wireless message from a remote transmitter using the spreading code, the spreading code having a length to compensate for no beam forming.

25. The method of claim 24, wherein the operating the receiver further comprises operating the receiver to decode the control PHY message.

26. The method of claim 24, wherein the operating the transmitter further comprises operating the transmitter with the beam forming to a region to communicate with at least one client in the region.

27. The method of claim 24, further comprising at least one of:
operating as a central point to at least one client;
operating as an access point to the at least one client;
operating as a base station to the at least one client;
operating as the at least one client as a station in a wireless network; and
operating as the at least one client as a cellular phone in a cellular network.

* * * * *